(12) United States Patent
Smirnov et al.

(10) Patent No.: US 7,984,461 B2
(45) Date of Patent: Jul. 19, 2011

(54) DISK CHUCKING DEVICE AND DISK DRIVING DEVICE HAVING THE SAME

(75) Inventors: Viatcheslav Smirnov, Suwon-si (KR); Dong-Yeon Shin, Suwon-si (KR); Sang-Kyu Lee, Suwon-si (KR); Dong-Woo Rhee, Suwon-si (KR)

(73) Assignee: Samsung Electro-Mechanics Co., Ltd., Suwon (KR)

( * ) Notice: Subject to any disclaimer, the term of this patent is extended or adjusted under 35 U.S.C. 154(b) by 734 days.

(21) Appl. No.: 12/149,954

(22) Filed: May 9, 2008

(65) Prior Publication Data
US 2009/0119690 A1 May 7, 2009

(30) Foreign Application Priority Data
Nov. 5, 2007 (KR) ........................ 10-2007-0112318

(51) Int. Cl.
*G11B 17/03* (2006.01)
(52) U.S. Cl. ....................................... 720/707
(58) Field of Classification Search .................. 720/707, 720/702, 623, 614, 600, 709, 712, 605, 604, 720/652
See application file for complete search history.

(56) References Cited

U.S. PATENT DOCUMENTS

| | | | |
|---|---|---|---|
| 6,845,512 B2 * | 1/2005 | Horng et al. ................. | 720/707 |
| 6,957,443 B2 * | 10/2005 | Horng et al. ................. | 720/707 |
| 2004/0205802 A1 * | 10/2004 | Horng et al. ................. | 720/707 |
| 2007/0294712 A1 * | 12/2007 | Ito et al. ...................... | 720/702 |
| 2007/0300247 A1 * | 12/2007 | Kim et al. ..................... | 720/707 |
| 2008/0046903 A1 * | 2/2008 | Takaki et al. ................. | 720/707 |
| 2008/0046905 A1 * | 2/2008 | Takaki et al. ................. | 720/707 |
| 2008/0046906 A1 * | 2/2008 | Takaki et al. ................. | 720/707 |

FOREIGN PATENT DOCUMENTS

| | | |
|---|---|---|
| JP | 2004-171706 | 6/2004 |
| KR | 10-2006-0020933 | 3/2006 |

OTHER PUBLICATIONS

Korean Office Action issued on Feb. 27, 2009 in corresponding Korean Patent Application 10-2007-0112318.

* cited by examiner

*Primary Examiner* — Allen T Cao

(57) ABSTRACT

A disk chucking device and a disk driving device having the same are disclosed. The disk chucking device may include: a chuck base, on which a boss is formed; chuck chips inserted in the chuck base in a manner such that the chuck chips protrude out from the chuck base; an elastic member, which elastically supports a pair of adjacent chuck chips towards an outer side of the chuck base; and a protrusion portion, which is formed on a bottom of the boss, and which supports the elastic member. The disk chucking device can improve the environment of the elastic members that support the chuck chips, to improve the alignment between the rotation centers of the disk and the chuck base.

12 Claims, 4 Drawing Sheets

DISK CHUCKING DEVICE AND DISK DRIVING DEVICE HAVING THE SAME

CROSS-REFERENCE TO RELATED APPLICATIONS

This application claims the benefit of Korean Patent Application No. 10-2007-0112318 filed with the Korean Intellectual Property Office on Nov. 5, 2007, the disclosure of which is incorporated herein by reference in its entirety.

BACKGROUND

1. Technical Field

The present invention relates to a disk chucking device and to a disk driving device having the disk chucking device.

2. Description of the Related Art

In general, a disk drive may include a deck base which forms the main body, a means for loading or unloading a disk onto or from the deck base, a means for rotating the disk loaded onto the loading/unloading means at a particular speed, and a means for recording or retrieving information onto or from the recording surface of the disk while traversing across the radius of the disk rotated by the rotating means.

Several types of disk drives are known to the public, examples of which may include disk drives in which a disk is loaded and unloaded while placed on a tray, or in which a disk is encased in a cartridge that is received into or ejected from the deck base.

A spindle motor may be employed as the means for rotating the disk can be a spindle motor, while a pickup unit may typically be used as the means for recording or retrieving information onto/from the recording surface of the disk. Also, a disk chucking device for securing the disk may be equipped on the deck base, where the disk may be inserted onto the chuck base and secured by chuck chips, etc.

An important matter in such a disk drive is to align the center of the disk mounted on the chuck base with the center of the chuck base itself. If the centers of the chuck base and the disk are misaligned, the high-speed rotation of the disk can further increase the eccentricity between the centers and can cause various vibrations and noise.

Also, if the centers of the chuck base and the disk are not aligned, problems may occur that prevent the pickup unit from accurately recording or retrieving information. These problems are may be related to whether or not the chuck chips are supported by an elastic member in a manner that allows smooth operation.

SUMMARY

An aspect of the invention provides a disk chucking device and a disk driving device equipped with the disk chucking device, in which the aligning of rotation centers between the disk and the chuck base is improved.

Another aspect of the invention provides a disk chucking device that includes: a chuck base, on which a boss is formed; chuck chips inserted in the chuck base in a manner such that the chuck chips protrude out from the chuck base; an elastic member, which elastically supports a pair of adjacent chuck chips towards an outer side of the chuck base; and a protrusion portion, which is formed on a bottom of the boss, and which supports the elastic member.

Here, the protrusion portion may extend downwards in an inclined manner from a perimeter of the boss, such that the protrusion portion surrounds a part of the elastic member. A support portion, which supports the elastic member, may be formed on a perimeter of the boss. Also, a guide portion, which faces the support portion, and which guides a movement of the elastic member, may be formed on the chuck base.

The guide portion can be curved, in a manner that allows the elastic member to provide an elastic force in a direction in which the chuck chip protrudes.

The elastic member can be, for example, a compression coil spring.

Yet another aspect of the invention provides a disk driving device that includes: a motor, which provides a driving force on the disk; a chuck base, on which a boss is formed, and which receives the driving force; chuck chips inserted in the chuck base, such that the chuck chips protrude out from the chuck base; an elastic member, which elastically supports a pair of adjacent chuck chips towards an outer side of the chuck base; and a protrusion portion, which is formed on a bottom of the boss, and which supports the elastic member.

Here, the protrusion portion may extend downwards in an inclined manner from a perimeter of the boss, such that the protrusion portion surrounds a part of the elastic member. A support portion, which supports the elastic member, may be formed on a perimeter of the boss. Also, a guide portion, which faces the support portion, and which guides a movement of the elastic member, may be formed on the chuck base.

The guide portion can be curved, in a manner that allows the elastic member to provide an elastic force in a direction in which the chuck chip protrudes.

The elastic member can be, for example, a compression coil spring.

Additional aspects and advantages of the present invention will be set forth in part in the description which follows, and in part will be obvious from the description, or may be learned by practice of the invention.

DETAILED DESCRIPTION

Figure 1:
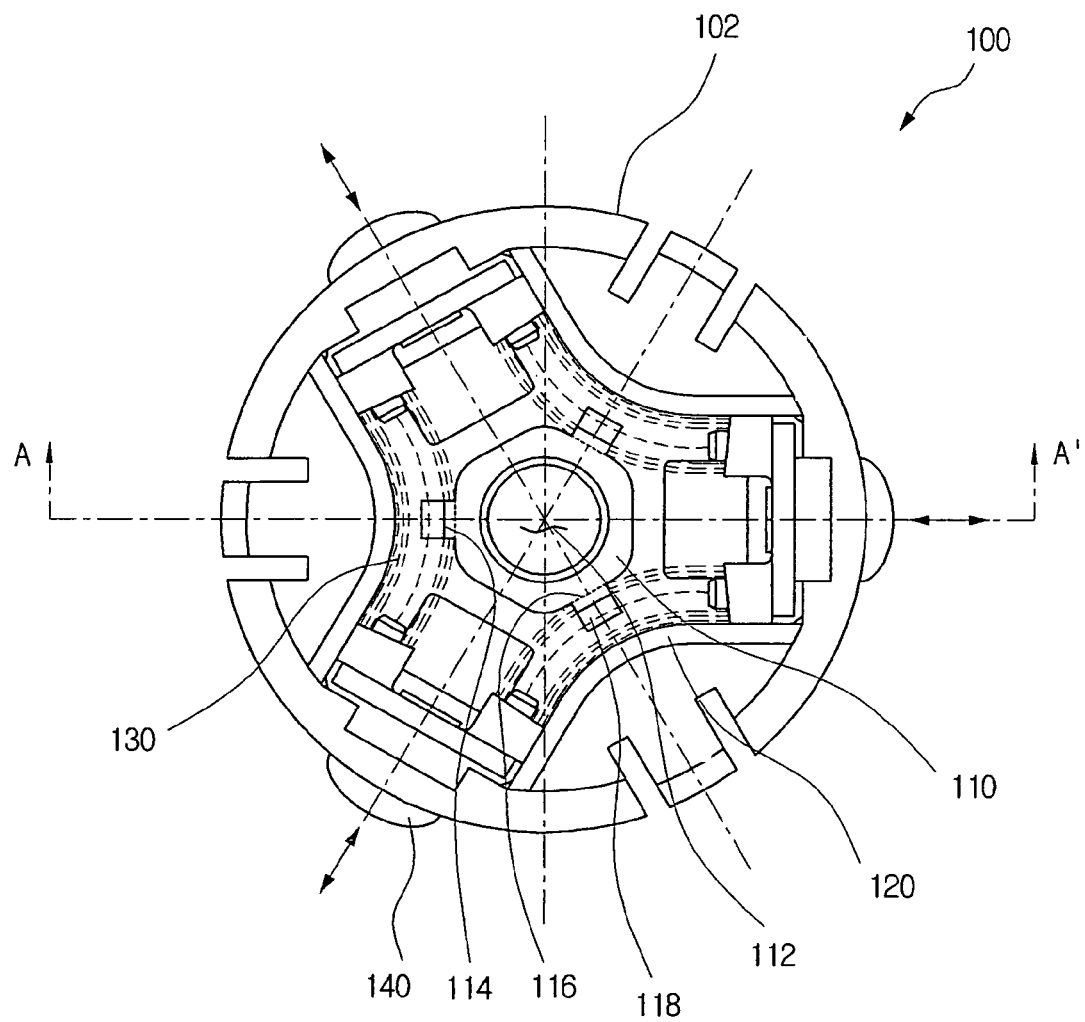
FIG. 1 is a bottom view illustrating a disk chucking device according to an embodiment of the invention.

A disk chucking device and a disk driving device equipped with the disk chucking device, according to certain embodiments of the invention, will be described below in more detail with reference to the accompanying drawings. Those components that are the same or are in correspondence are rendered the same reference numeral regardless of the figure number, and redundant explanations are omitted.

Figure 2:
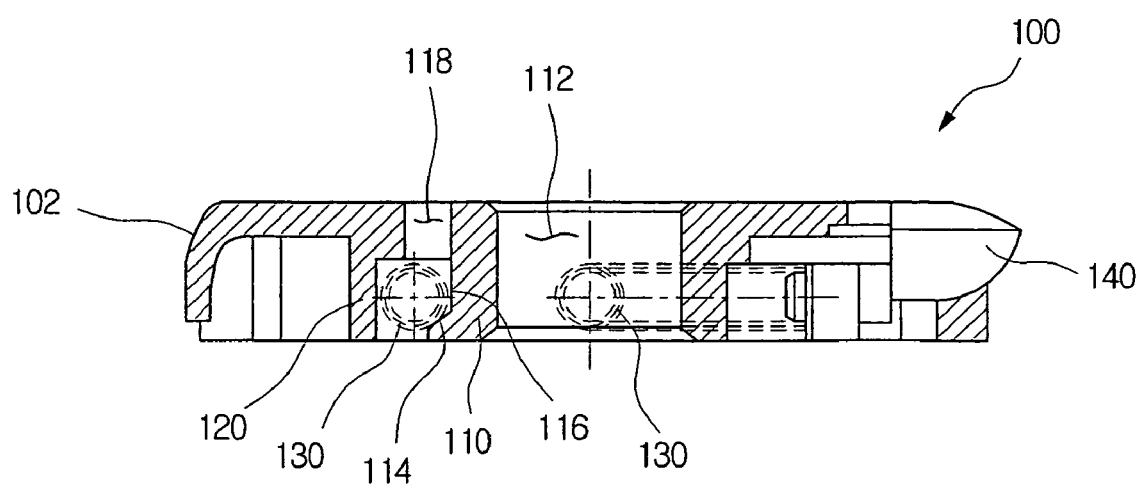
FIG. 2 is a cross-sectional view illustrating the disk chucking device of FIG. 1 across line A-A'.
Figure 3:
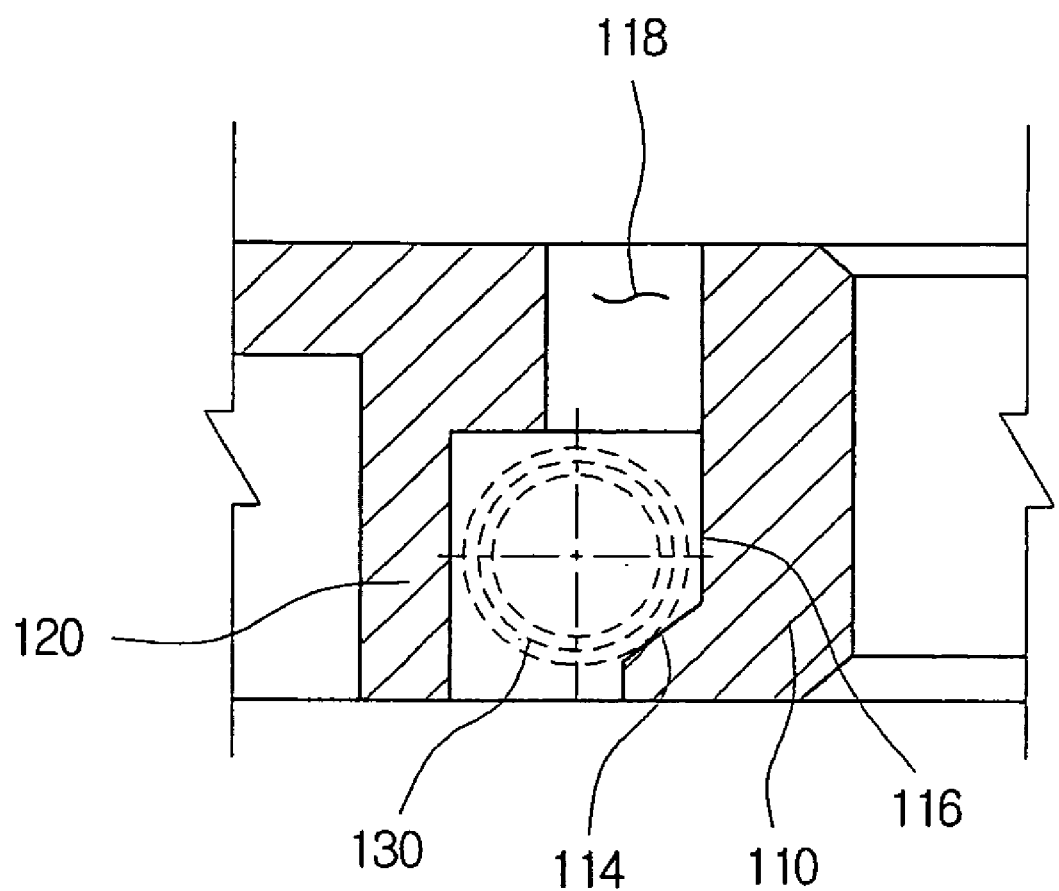
FIG. 3 is a partial cross-sectional view illustrating a disk chucking device according to an embodiment of the invention.

FIG. 1 is a bottom view illustrating a disk chucking device according to an embodiment of the invention, FIG. 2 is a cross-sectional view illustrating the disk chucking device of FIG. 1 across line A-A', and FIG. 3 is a partial cross-sectional view illustrating a disk chucking device according to an embodiment of the invention. In FIGS. 1 to 3, there are illustrated a disk chucking device 100, a chuck base 102, a boss 110, a center hole 112, protrusion portions 114, a support portion 116, through-holes 118, guide portions 120, elastic members 130, and chuck chips 140.

A disk chucking device 100 according to an embodiment of the invention may include a chuck base 102 on which a boss 110 may be formed, multiple chuck chips 140 inserted in the base 102 to protrude outwards from the chuck base 102, elastic members 130 which each elastically supports a pair of adjacent chuck chips 140 to the outer side of the chuck base 102, and protrusion portions 114 formed at the bottom of the boss 110 to support the elastic members 130. By virtue of this configuration, the disk chucking device 100 may improve the operating environment of the elastic members 130 that support the chuck chips 140, to improve the alignment between the rotation centers of the disk and the chuck base 102.

The disk may be a recording medium capable of storing information, and may be a ring-shaped circular plate. The disk chucking device 100 may be inserted into the inner perimeter of the disk, to secure the disk in the disk driving device.

As illustrated in FIGS. 1 and 2, a boss 110 may be formed on the chuck base 102. The chuck base 102 may hold and cover the components of the disk chucking device 100. The boss 110 may be formed on the inside of the chuck base 102, and may be coupled to the rotating shaft of a motor.

The chuck base 102 may have a generally circular shape, and may have a center hole 112 formed in the middle. The rotating shaft of the motor can be inserted through the center hole 112 and secured. The chuck chips 140 may be inserted along the circumference of the chuck base 102 in particular intervals. The center hole 112 may be formed in the center of the boss 110.

The chuck chips 140 may be inserted through the chuck base 102 and may protrude outwards, due to the elastic forces applied by the elastic members 130, to press the inner perimeter of the disk. In one example, three chuck chips 140 may be arranged around the center hole 112 at angles of 120 degrees. In such a case, there may also be three elastic members 130 arranged in 120 degree angles. Thus, the chuck chips 140, and the elastic members 130 that elastically support the chuck chips 140, can be positioned in a generally triangular arrangement.

While the disk chucking device described for this particular embodiment is illustrated with three elastic members 130 and three chuck chips 140, the invention is not thus limited, and it is to be appreciated that any of various numbers of chuck chips 140 and elastic members 130 may be included according to design conditions, etc. For example, four, five, or six chuck chips 140 may be arranged in particular intervals.

A chuck chip 140 can be pressed simultaneously by a pair of adjacent elastic members 130. Conversely, an elastic member 130 can simultaneously press a pair of adjacent chuck chips 140. Because two adjacent elastic members 130 may simultaneously press a chuck chip 140, even if the elasticity is different for each of the elastic members 130, the differences can be cancelled out to a certain degree.

Although the elastic members 130 used may be such that are all supposed to have the same elasticity, certain differences may occur during fabrication. Such differences in elasticity can cause misalignment between the center of the disk and the center of the chuck base 102. However, in the disk chucking device according to this embodiment, one elastic member 130 may simultaneously press the pair of adjacent chuck chips 140, and one chuck chip 140 can be pressed simultaneously by the forces applied by the pair of adjacent elastic members 130.

As such, since the elastic members 130 may be linked together by way of the chuck chips 140, the differences in elasticity of the elastic members 130 can be distributed, to provide a generally self-adjusting configuration. The elastic members 130 can be, for example, compression coil springs.

One or more protrusion portions 114 may be formed at the bottom of the boss 110 to support the elastic members 130. Multiple protrusion portions 114 may be used, according to the positions and number of the elastic members 130. The protrusion portions 114 may be such that are elongated outwards from the lower end of the perimeter of the boss 110. The protrusion portions 114 may also be formed in a downwardly inclining manner from the perimeter of the boss 110, so as to surround parts of the elastic members 130.

As a disk is inserted onto the disk chucking device 100, the chuck chips 140 may contract. Here, the elastic members 130 that elastically support the chuck chips 140 may be compressed. A compressed elastic member 130 may protrude downwards and undergo unnecessary bending. Unnecessary bending of the elastic members 130 is related to the occurrence of differences in elasticity, and thus may become a cause of misalignment between the centers of the disk and the chuck base 102.

However, as illustrated in FIG. 3, the protrusion portions 114 may cover parts of the elastic members 130 and support the elastic members 130 towards the bottom surface of the chuck base 102. In this way, the compressed elastic members 130 may be prevented from protruding downwards for unnecessary bending, and differences in elasticity can be avoided, so that the centers of the chuck base 102 and the disk can be aligned.

A support portion 116 for supporting the elastic members 130 can be formed on the perimeter of the boss 110. As illustrated in FIG. 1, the support portion 116 may provide flat surfaces along the perimeter of the boss 110, to allow the elastic members 130 to curve widely. The support portion 116 may prevent the elastic members 130 from curving abruptly, and may allow the compressing and relaxing motions of the elastic members 130 to follow a wide a curve as possible. A reason for this is that excessive curving and unnecessary curving of the elastic members 130 are related to the occurrence of differences in elasticity.

Guide portions 120 may be formed facing the support portion 116 such as to guide the movement of the elastic members 130. The guide portions 120 may be formed opposite the support portion 116 to define the spaces in which the elastic members 130 may be held. The guide portions 120 can include straight parts, which may be adjacent to the chuck chips on either side, and can include curved parts in-between the straight parts. The curved parts of the guide portions 120 may be curved widely, such that the elastic members 130 may provide elastic forces in the directions towards which the chuck chips 140 are protruding. The elastic members 130 can be made to compress or relax in the range of the straight portions, to better maintain uniform elasticity.

Thus, the guide portions 120 can have parts adjacent to the chuck chips 140 formed in straight lines, so as to arrange each of the elastic members 130 in a position for supporting the pair of adjacent chuck chips 140, while at the same time allowing the end parts of each of the elastic members 130 to move in the protruding directions of the chuck chips 140, i.e. in the radial direction of the chuck base 102.

As illustrated in FIG. 3, the chuck base 102 can be formed such that the bottom surface is in contact with the elastic members 130, in order to prevent unnecessary bending in the elastic members 130. Also, through-holes 18 may be formed in the bottom surface of the chuck base 102, in positions where the protrusion portions 114 are formed. The through-holes 118 can be used to facilitate manufacture, for example, in cases where the chuck base 102 is formed by a method of injection molding, etc., and in certain cases, can be used to eliminate the need for additional processing procedures with regards the molded form. As such, the through-holes 118 can be employed to form the protrusion portions 114 in a more cost-efficient manner.

The protrusion portions 114 can also be used to eliminate supplementary procedures in manufacturing the disk chucking device 100. For example, in manufacturing a disk chucking device 100, the elastic members 130 may be inserted in the chuck base 102, but before the disk chucking device 100 may be coupled to a motor, the elastic members 130 can become disengaged from the chuck base 102, and a process of temporarily securing the elastic members 130 may be required to prevent this. The protrusion portions 114 of this embodiment, however, can prevent the disengaging of the elastic members 130 that may occur during the manufacturing process, so that unnecessary processes, such as for temporarily securing the elastic members 130, may be omitted.

Figure 4:
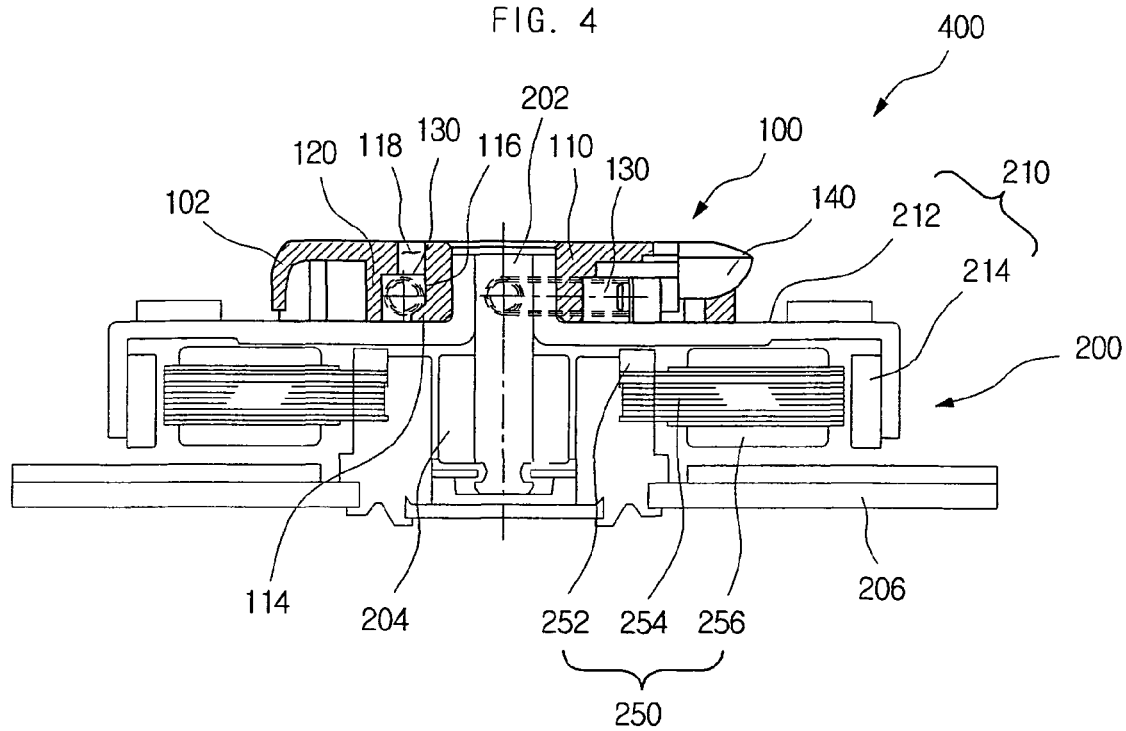
FIG. 4 is a cross-sectional view illustrating a disk driving device according to another embodiment of the invention.

FIG. 4 is a cross-sectional view illustrating a disk driving device according to another embodiment of the invention. In FIG. 4 are illustrated a motor 200, a rotating shaft 202, a sleeve 204, a base 206, a rotor 210, a cover portion 212, magnets 214, a stator 250, a core 252, teeth 254, coils 256, and a disk driving device 400.

A disk driving device 400, according to another embodiment of the invention, may include a motor 200 which may supply a driving force to the disk, a chuck base 102 on which a boss 110 may be formed that receives the driving force, multiple chuck chips 140 which may be inserted in the chuck base 102 such that they protrude outwards from the chuck base 102, elastic members 130 which may each elastically support a pair of adjacent chuck chips 140 towards the outer side of the chuck base 102, and protrusion portions 114 which may be formed at the lower end of the boss 110 to support the elastic members 130. The disk driving device 400 can improve the operating environment of the elastic members 130 that support the chuck chips 140, and improve the alignment between the rotation centers of the disk and the chuck base 102.

As illustrated in FIG. 4, the disk driving device 400 may include a disk chucking device 100, onto which a disk can be inserted and secured, and a motor 200, which can provide a driving force to the disk chucking device 100.

The motor 200 can be a device for providing a driving force to the disk chucking device 100, and can be divided mainly into a rotor 210, which may be coupled to the disk chucking device 100 to rotate together with the disk chucking device 100, and a stator 250, which may provide a rotational force to the rotor 210.

The stator 250 may include teeth 254 affixed to a core 252, and coils 256 secured around the perimeter of the teeth 254. At an inner part of the teeth 254, a sleeve 204 may be included, which may support a rotating shaft 202 and allow smoother rotation. An electric current can be inputted to the coils 256, whereby an electrical field may be formed. The coils 256 can be arranged adjacent to magnets 214, which may be affixed to the rotor 210. The rotating shaft 202 may rotate together with the rotor 210 and may serve to transfer the rotational force to the disk chucking device 100.

The rotor 210 may rotate together with the rotating shaft 202 and the disk chucking device 100, and may have a generally circular horizontal cross section. The rotor 210 may be open downwards, and may include a cover portion 212 that may be in contact with the disk chucking device 100. The cover portion 212 can generally be shaped as a circular plate, and an upper surface of the cover portion 212 may be in contact with the disk chucking device 100.

Into the upwardly-protruding insertion portion of the cover portion 212, the rotating shaft 202 may be inserted. At the outer side of the insertion portion, the center hole 112 of the disk chucking device 100 may be inserted on and secured. In this way, the driving force of the rotating shaft 202 may be transferred to the disk chucking device 100.

The disk chucking device 100 that forms a part of the disk driving device 400 based on this embodiment of the invention can have substantially the same composition and can provide substantially the same effects as those of the disk chucking device 100 based on the previously described embodiment of the invention. Thus, the disk chucking device 100 according to this embodiment can also have protrusion portions 114 formed at the lower end of the boss 110, so that unnecessary bending of the elastic members 130 may be prevented. As a result, a disk driving device may be provided, in which the occurrence of differences in the elasticity of the elastic members 130 can be suppressed, for improved alignment between the centers of rotation of the disk and the chuck base 102. Other technical features of the disk chucking device 100 described above can be included.

Furthermore, the protrusion portions 114 can separate the elastic members 130 from the cover portion 212 of the rotor 210, making it so that the movement of the elastic members 130 may not be affected by the state of the surface of the cover portion 212. As such, the protrusion portions 114 based on this embodiment of the invention allow the elastic members 130 to undergo particular actions regardless of the environment of the cover portion 212 onto which the disk chucking device 100 may be installed, thereby further helping the alignment of centers between the disk and the chuck base 102.

As set forth above, certain aspects of the invention can improve the environment of the elastic members that support the chuck chips, to improve the alignment between the rotation centers of the disk and the chuck base.

While the spirit of the invention has been described in detail with reference to particular embodiments, the embodiments are for illustrative purposes only and do not limit the invention. It is to be appreciated that those skilled in the art can change or modify the embodiments without departing from the scope and spirit of the invention.

What is claimed is:

1. A disk chucking device comprising:
a chuck base having a boss formed thereon;
a plurality of chuck chips inserted in the chuck base such that the chuck chips protrude out from the chuck base;
an elastic member elastically supporting a pair of adjacent chuck chips towards an outer side of the chuck base; and
a protrusion portion formed on a bottom of the boss and supporting the elastic member.

2. The disk chucking device of claim 1, wherein the protrusion portion extends downwards in an inclined manner from a perimeter of the boss such that the protrusion portion surrounds a part of the elastic member.

3. The disk chucking device of claim 1, wherein a support portion is formed on a perimeter of the boss, the support portion supporting the elastic member.

4. The disk chucking device of claim 3, wherein a guide portion is formed on the chuck base, the guide portion facing the support portion and configured to guide a movement of the elastic member.

5. The disk chucking device of claim 4, wherein the guide portion is curved such as to allow the elastic member to provide an elastic force in a direction in which the chuck chip protrudes.

6. The disk chucking device of claim 1, wherein the elastic member is a compression coil spring.

7. A disk driving device comprising:
a motor configured to provide a driving force on the disk;
a chuck base having a boss formed thereon and configured to receive the driving force;
a plurality of chuck chips inserted in the chuck base such that the chuck chips protrude out from the chuck base;
an elastic member elastically supporting a pair of adjacent chuck chips towards an outer side of the chuck base; and
a protrusion portion formed on a bottom of the boss and supporting the elastic member.

8. The disk driving device of claim 7, wherein the protrusion portion inclines downwards from a perimeter of the boss such that the protrusion portion surrounds a part of the elastic member.

9. The disk driving device of claim 7, wherein a support portion is formed on a perimeter of the boss, the support portion supporting the elastic member.

10. The disk driving device of claim 9, wherein a guide portion is formed on the chuck base, the guide portion facing the support portion and configured to guide a movement of the elastic member.

11. The disk driving device of claim 10, wherein the guide portion is curved such as to allow the elastic member to provide an elastic force in a direction in which the chuck chip protrudes.

12. The disk driving device of claim 7, wherein the elastic member is a compression coil spring.

* * * * *